United States Patent [19]
Bannon

[11] Patent Number: 5,102,583
[45] Date of Patent: Apr. 7, 1992

[54] APPARATUS FOR CONTACTING A GAS AND A LIQUID

[75] Inventor: Robert P. Bannon, Houston, Tex.

[73] Assignee: Shell Oil Company, Houston, Tex.

[21] Appl. No.: 625,520

[22] Filed: Dec. 11, 1990

[51] Int. Cl.$^5$ .............................................. B01F 3/04
[52] U.S. Cl. ............................................... 261/114.1
[58] Field of Search ................................... 261/114.1

[56] References Cited

U.S. PATENT DOCUMENTS

| | | | |
|---|---|---|---|
| 2,746,846 | 5/1956 | Grunewald et al. | 261/114.1 |
| 3,364,988 | 1/1968 | Hartmann | 261/114.1 |
| 3,768,234 | 10/1973 | Hardison | 55/223 |
| 3,992,492 | 11/1976 | Vikholm | 261/110 |
| 4,036,918 | 7/1977 | Morgan et al. | 261/114.1 |
| 4,247,368 | 1/1981 | Bannon et al. | 202/158 |

FOREIGN PATENT DOCUMENTS 1231505  5/1971  United Kingdom .

OTHER PUBLICATIONS

Perry's Chemical Engineers' Handbook, 6th Edition, McGraw-Hill, 1984, pp. 18-3 to 18-6; 6-57 to 6-62.

Primary Examiner—Tim Miles

[57] ABSTRACT

In an apparatus for contacting gas and liquid comprising a substantially vertical column containing a number of substantially horizontal contacting trays in which each tray is provided with passages for gas and liquid, which apparatus further comprises a controller indicating the density of the mixture of gas and liquid at at least one contacting tray which controller communicates with means to control the flow of liquid from a lower contacting tray ("control tray"), upwards-flowing gas from the lowermost contacting tray and downwards-flowing liquid from an upper contacting tray are contacted, the improvement comprising that the density of the mixture of upwards-flowing gas and downwards-flowing liquid at least one contacting tray is monitored and said density is maintained at a desired level by controlling the flow of liquid from the control tray.

13 Claims, 2 Drawing Sheets

APPARATUS FOR CONTACTING A GAS AND A LIQUID

FIELD OF THE INVENTION

The present invention relates to an apparatus and method for contacting a gas and a liquid in a plate column containing contacting trays. Such gas-liquid contacting plate columns are of particular relavance in the purification of gases.

BACKGROUND OF THE INVENTION

Absorption is one of the most important gas purification techniques. It involves the transfer of materials from a gas into a liquid. The absorbed material may dissolve physically in the liquid or react chemically with certain compounds of the liquid.

Absorbers used in gas purification include packed columns, plate columns and bubble columns. Plate columns are frequently used. They comprise trays designed for contacting gas and liquid. Such contacting trays may comprise apertures through which both liquid and gas are passed, but also apertures for the passage of gas and downcomers for the passage of liquid. These contacting trays include e.g. bubble cap trays, valve trays and sieve trays. During operation the gas in fed into a lower portion of the column to flow upwards and the liquid is fed into an upper portion of the column to flow downwards. The gas and liquid are contacted with each other during their flows upward and downward, respectively.

Conventional operation of a plate column attempts to avoid back-mixing between trays which may occur as a result of entrainment of liquid droplets or froth by the upwards-flowing gas. It has been described that such entrainment reduces the overall efficiency of the column. In order to avoid entrainment the design of the plate column is usually such that the space between two subsequent contacting trays allows for breaking of the froth formed so that a separation of gas and liquid is obtained and the gas may enter the next contacting tray without entraining substantial amounts of liquid. It is evident that in order to accomplish this separation of gas and liquid, at every tray a substantial amount of essentially void space must be provided in which little mass transfer occurs.

It may be advantageous to create as little of this void space as possible and to accept the backmixing. Especially in cases when an absorbed component of the gas reacts with the contacting liquid, the concentration of absorbed but unreacted material in the liquid is small so that such concentration does not form an impediment to further absorption. Backmixing is acceptable in such cases. It would then be advantageous to have a column which is virtually filled with froth without any substantial void space. In the prior art no recognition is made the backmixing is plate columns is acceptable in such cases.

Bubble columns operate filled with froth substantially without void space. However, they suffer the disadvantage that gas bubble formation occurs only at the gas inlet. On the other hand, in plate columns gas bubbles are reformed at every tray and mass transfer is thus enhanced.

In U.S. Pat. No. 3,992,492 an apparatus for contacting a gas and a liquid is described in which a foam is introduced at the top and gas at the bottom. The foam is entrained by the gas over foam-supporting elements, which are constructed such that a passage is created between the elements which passage is shielded from gas so that a downflow of foam can be obtained. By means of sensors the level of foam in the top of the apparatus is determined. Periodically foam is supplied to the foam-supporting elements. Hence, it appears that this apparatus operates in a batch-type fashion.

It is an object of the present invention to provide an apparatus into which a lean liquid can be fed which can be operated continuously.

It is a further object of the present invention to provide an apparatus which is suitable for gas-liquid contact in which backmixing occurs in a controlled manner.

SUMMARY OF THE INVENTION

Accordingly, the present invention provides an apparatus for contacting gas and liquid comprising.
- a substantially vertical column containing a number of substantially horizontal contacting trays in which each contacting tray is provided with passages for gas and liquids;
- a liquid inlet provided in the upper section of the column;
- a gas outlet located above the uppermost contacting tray,
- a gas inlet provided in the lower section of the column; and
- a liquid outlet below the lowermost contacting tray, which apparatus further comprises
- means to control the flow of liquid from a contacting tray in the lower portion of the column ("the control tray"), and
- a controller indicating the density of the mixture of gas and liquid at least one contacting tray above the control tray which controller communicates with the means to control the flow of liquid from the control tray.

DETAILED DESCRIPTION OF THE INVENTION

Controllers indicating the density of gas/liquid mixtures are known. Such controllers include hydrometers and density meters that measure the resonant vibration frequency of a U-tube that depends on the mass and hence the density of the fluid inside, and gamma ray densitometers that create a signal proportional to the density of the sample contained therein. All such controllers may be used in the apparatus of the present invention. Most conveniently the controller used is a differential pressure controller which is activated by the pressure difference over at least one contacting tray.

The use of differential pressure controllers in gas purification is known. From U.S. Pat. No. 3,768,234 it is known to use a differential pressure controller in a venturi scrubber system to purify a solids-laden gas. The controller is utilized to effect a variation of liquid flow into the throat section of the venturi system. In the present invention a density controller, preferably a differential pressure controller, is applied in a plate column and is used to establish the desired level of liquid and froth in the intertray spaces between all or a portion of the trays in the column.

In the present invention a conventional plate column may be used provided that an appropriate controller, such as a differential pressure controller, has been arranged which is in communication with means to control the flow of liquid from a contacting tray in the lower portion of the column which is then the control tray. Preferably, the control tray is the lowermost contacting tray. It is suitable to have the liquid inlet provided above the uppermost contacting tray and the gas inlet below the lowermost contacting tray.

When a differential pressure controller is used, it is activated by the pressure drop over at least one contacting tray. Hence, in one embodiment, the differential pressure controller is activated by the pressure drop over just one contacting tray. Preferably, it is activated by the pressure difference between the spaces above the uppermost contacting tray and the control tray. To that effect pressure measurement means may be placed in the desired spaces. Such measurement means may be commerically available pressure sensing devices which provide a hydraulic or electric signal to the differential pressure controller. The latter may also be a standard device provided with bellows, diaphragms, sealed capsules and the like to result in a, usually electric, signal which regulates the means for controlling the flow of liquid from the control tray.

One way of controlling the flow of the liquid from the control tray is by controlling the flow of liquid fed to the column. Hence, such means for controlling the flow of liquid from the control tray may be constituted by a valve positioned in a liquid feed conduit connected to the liquid inlet of the column. It is suitable in such cases to arrange for a fixed restriction in the passage for liquid at the control tray.

Another possibility is to arrange the means for controlling the liquid flow as a valve in a liquid conduit emanating from the liquid outlet. Such arrangement is especially suitable if no surge capacity for the liquid leaving the column is needed. In this case it would be preferable to provide the gas inlet of the column with a sparger.

As to the means for controlling the liquid flow, it is preferred to apply such means in the passage for the liquid from the control tray which, more preferably, is the lowermost contacting tray.

As stated before, the present invention may utilize a conventional plate column. Hence, all conventional contacting tray types may be used. Such tray types include bubble-cap, sieve and valve trays. The liquid flow patterns, on such trays include counterflow, crossflow, reverse flow, cascade and multiple pass. It connection herewith reference is made to *Perry's Chemical Engineer's Handbook*, 6th ed., McGraw-Hill, 1984, pp. 18-3 ff. Preferably, the passage for the liquid from the control tray is constituted by a downcomer. The downcomer suitably debouches into a seal pan. In a preferred embodiment the means for controlling the flow of the liquid from the control tray is constituted by a valve positioned in the seal pan. In another embodiment such a valve is positioned in the downcomer. Such a valve could be of any conventional type. For suitable valves reference is made to *Perry's Chemical Engineer's Handbook*, pp. 6-57 ff. It is specifically preferred to apply a butterfly valve in the seal pan or downcomer.

Another suitable way to control the flow of liquid in the downcomer from the control tray is to inject an amount of gas into said downcomer. This gas flowing up the downcomer will restrict the amount of liquid that can flow countercurrently down the downcomer and thus, regulating the amount of this gas will control the amount of liquid flowing downwards. Obviously, such gas can be any gas inert to the liquid or gas applied in the column. Preferably, the injected gas is a bystream of the gas being treated in the column. Thereto the apparatus according to the invention may be provided with a gas conduit which debouches into the downcomer and in which a valve has been arranged, which valve constitutes the means for controlling the flow of the liquid from the control tray.

In another preferred embodiment the downcomer is sealed and a liquid conduit is arranged that passes from the downcomer to a space below the control tray in the column and that has been provided with a valve which serves as the means for controlling the flow of liquid from the control tray.

As stated before, the apparatus according to the present invention is very suitable for use as a gas-liquid contact apparatus in which backmixing occurs. Thereto a part of the column will be operated in a flooded condition. This entails that a significant amount of froth on top of one contacting tray is taken to the contacting tray immediately above it. This can be achieved by any of the means mentioned above. When a tray gets flooded, the density of the mixture at the tray and also the pressure drop over this tray will increase. When density measurements or pressure drop measurements indicate that the desired number of trays are in a flooded condition, the flow from the control tray is regulated, so that the number of trays in a flooded condition does not increase. The contacting trays are brought into a flooded condition by regulating the liquid flow from the control tray. The flooded condition is thus not the result of any inherent capacity limitation of the trays. Hence, the number of trays in a flooded condition can be controlled and prevented from increasing by careful regulation of the liquid flow from the control tray.

From the foregoing it is evident that it is possible to create a flooded condition at only a selected number of contacting trays. It is advantageous to ensure that a number of trays at the top of the column are not in a flooded condition. This will reduce the likelihood that gas leaving the column would entrain liquid droplets. Hence, it is convenient to arrange for 1 to 4, preferably 2 or 3 trays that are not in a flooded condition. Such trays may be identical to the contacting trays that are in a flooded condition. However, it is preferred to arrange above the uppermost contacting tray, which, during operation, is in a flooded condition, a limited number of high-capacity trays. These are trays which are also suitable for contacting gas and liquid but which have been designed for a larger capacity than such contacting trays. Such high-capacity trays make it possible to operate the contacting trays in a flooded condition even closer to their ultimate capacity without increasing the likelihood of liquid entrainment from the column. In general, it would be sufficient to arrange for 1 to 4 high-capacity trays to be present. Preferably the number of high-capacity trays ranges from 2 to 3. In one embodiment, these high-capacity trays could be similar to the contacting trays, but with a larger intertray spacing. In a preferred embodiment these high-capacity trays would be provided with a larger active area than the contacting trays. Usually this active area is the cross-section of the column minus the downcomer top and bottom areas. Hence, it would be possible to arrange for the majority of the contacting trays to be of the cross-flow type with downcomers, whereas the high-capacity trays would be sieve plate of a counterflow-type. That entails that the active area for the former trays would be the column cross-section minus the downcomer areas, whereas for the latter trays the active area would be the complete column cross-section. In a further embodiment the increase in the tray active area is accomplished by increasing the diameter of the column at the position where the high-capacity trays are arranged. Due to the decrease in the gas velocity caused by the increase in column area, the liquid entrainment is reduced, if not stopped.

It may be advantageous to arrange for a differential pressure indicator above the uppermost contacting tray which during operation is in a flooded condition. Such indicator could e.g., be arranged above the uppermost high-capacity tray and said uppermost contact tray. This indicator would monitor the operating condition of the contacting trays not intended to be in a flooded condition. It could serve as a guide to the setting of the control point of the density controller, or preferably the differential pressure controller. In principle, the differential pressure indicator could be fashioned to automatically reset the differential pressure controller set point is such a way as to keep the flooded zone flooded and the upper contacting trays or high-capacity trays unflooded.

As stated before, the apparatus according to the present invention is very suitable for use in the purification of gases with liquids, wherein gaseous components react with the liquid or compounds in the liquid. Examples of such systems include hydrogen sulfide absorption with a metal ion complex, such as iron (II); the absorption of sour gases, containing hydrogen sulfide, carbonyl sulfide and/or carbon dioxide, with alkanolamine solutions, such as mono- and diethanolamine, di-isopropanolamine etc.; the absorption of acid gases such as hydrogen chloride in an alkaline solution, e.g. caustic; and the absorption of ammonia with an aqueous, optionally acidic, solution.

So the inventioon further provides a method for contacting a gas and a liquid in a plate column comprising feeding the gas into the column underneath a lower contacting tray to pass upwards; feeding the liquid into the column above an upper contacting tray to flow downwards; contacting the upwards-flowing gas and the downwards-flowing liquid in the column between the upper and the lower contacting trays; removing the gas from the top of the column and removing liquid from a liquid outlet at the bottom of the column, the improvement comprising that the density of the mixture of upwards-flowing gas and downwards-flowing liquid at least one contacting tray is determined and said density is maintained at a desired level by controlling the flow of liquid from a contacting tray in the lower portion of the column ("the control tray").

As indicated above, it is preferred to determine the pressure difference over at least one contacting tray and to maintain said pressure difference at a desired level by controlling the flow of liquid from the control tray, which is preferably the lowermost contacting tray.

BRIEF DESCRIPTION OF THE DRAWINGS

The invention shall be further illustrated by means of the following drawings.

DETAILED DESCRIPTION OF THE DRAWINGS

Figure 1:
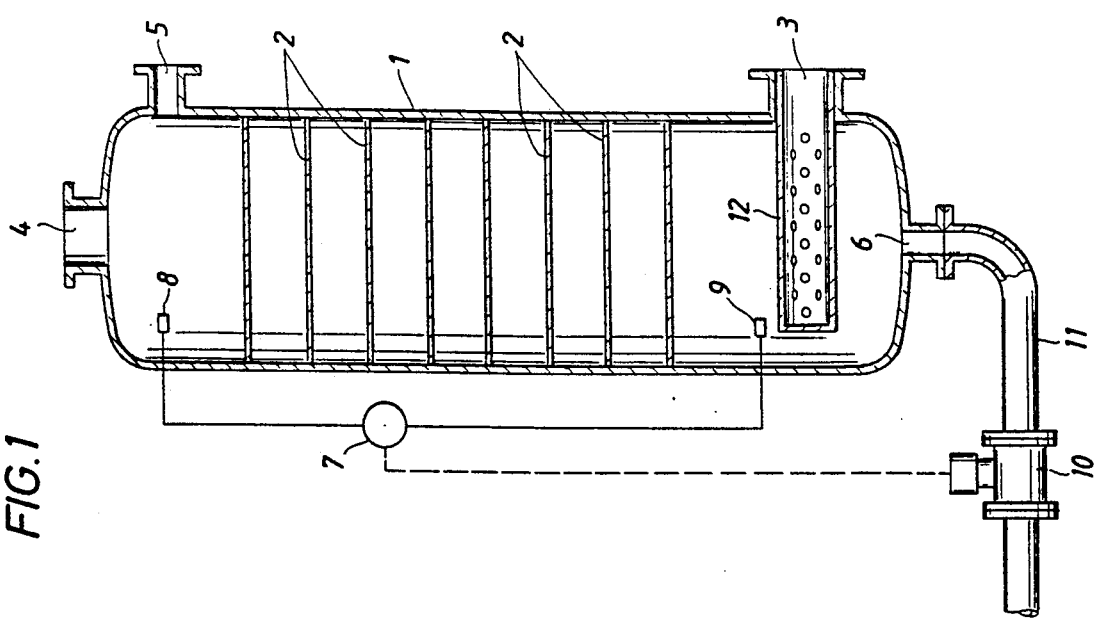
FIG. 1 shows an embodiment of the present apparatus.

FIG. 1 shows a plate column 1 provided with contacting trays 2. The contacting trays shown are of a sieve-plate type, without downcomer, but could be of any other type of tray as indicated before. The column 1 further contains a gas inlet 3 located below the lowermost contacting tray 2, a gas sparger 12, a gas outlet 4, a liquid inlet 5 and a liquid outlet 6. A differential pressure controller 7 gets its information via pressure sensors 8 and 9, located above the uppermost contacting tray and below the lowermost contacting tray, respectively. The differential pressure controller is in communication with a valve 10 arranged in a liquid conduit 11. During carrying out of the gas/liquid contact, gas to be purified and liquid are fed into the column 1 through inlets 3 and 5, respectively. The gas and liquid are in contact over the contacting trays 2. By partially closing valve 10 the liquid flow out of outlet 6 and through conduit 11 is restricted, resulting in a liquid built-up in the column and an increased pressure drop as measured by the pressure sensors 8 and 9. At a predetermined value of the pressure drop, the closing of the valve is stopped and by means of the differential pressure controller 7 the level of the pressure drop and hence of the liquid build-up and thus of the entrainment is kept at a constant value.

Figure 2:
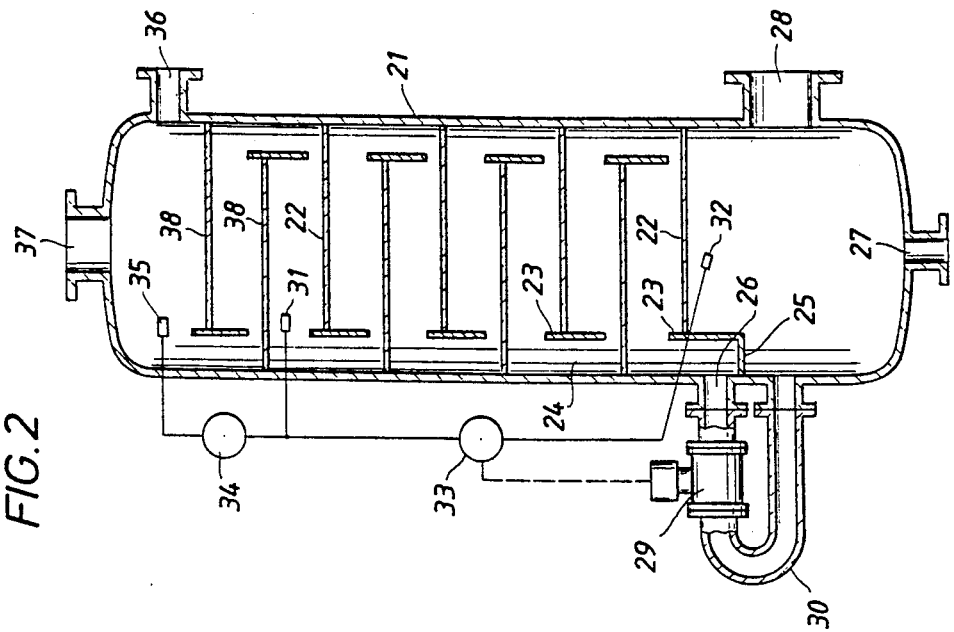
FIG. 2 indicates another embodiment with arrangements to control the liquid flow from the lowermost tray via an conduit provided with a valve.

In FIG. 2 another embodiment is shown. A plate column 21 provided with contacting sieve trays 22 which are provided with baffles 23 provide contact between a gas fed into the column 21 via an inlet 28 and a liquid fed into the column 21 via an inlet 36. The liquid leaves the column 21 via an outlet 26 which is connected to a conduit 30 that further contains a valve 29. The conduit 30 passes the liquid on into the column which is subsequently withdrawn via an outlet 27. The liquid reaches the outlet 26 via downcomers 24 which are constituted by the baffles 23 and the wall of the column 21. The downcomer at the lowermost contacting tray 22 is sealed with plate 25 so that the down-flowing liquid is forced to flow through conduit 30. The valve 29 communicates with a differential pressure controller 33 which receives pressure signals from sensors 31 and 32, respectively. Above sensor 31 there are provided additional contacting trays 38. The latter trays are identical to the contacting trays 22. The pressure drop over the additional contacting trays 38 is shown by a differential pressure indicator 34 which indicates the pressure difference between the pressures of sensors 35 and 31. During operation the additional trays 38 are kept in a non-flooded condition to ensure a minimal entrainment of liquid droplets by the upwards-flowing gas leaving the column via gas outlet 37.

Figure 3:
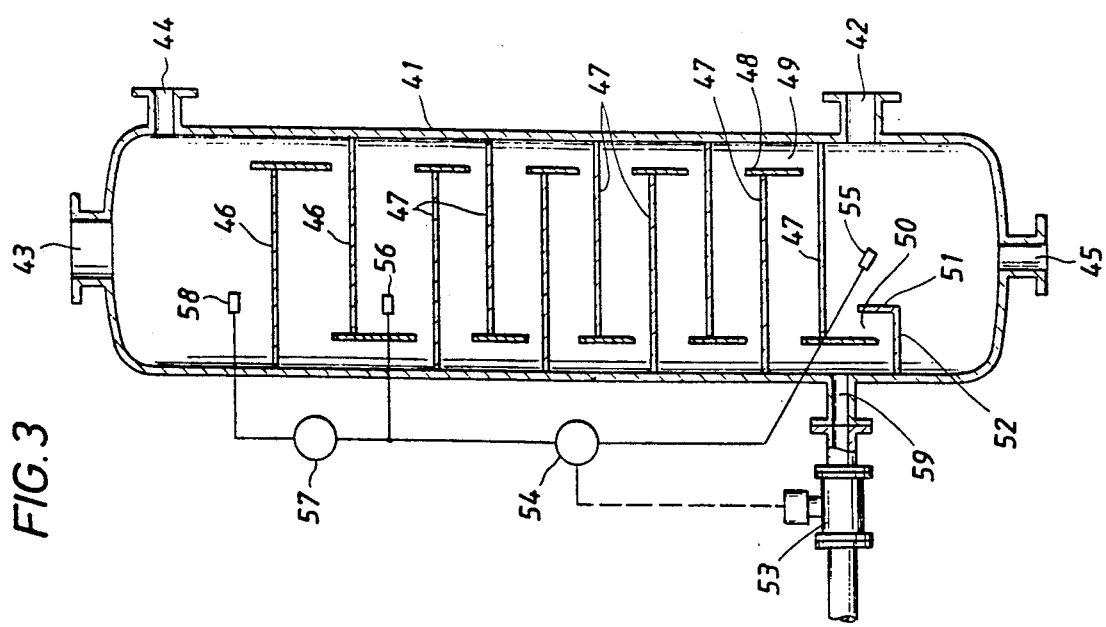
In FIG. 3 an apparatus according to the invention is shown which is provided with arrangements for gas injection into the bottom downcomer and comprises high-capacity trays at an increased intertray spacing.

In FIG. 3 a plate column 41 is provided with contacting trays 47 arranged with baffles 48 creating downcomers 49. The downcomer 49 of the lowermost contacting tray debouches into a seal pin 50 which is created by the plate 52 and a weir 51. A gas conduit 59 is also debouching into the said downcomer. The conduit contains a valve 53 which is in communication with a differential pressure controller 54. This controller 54 receives information from sensors 55 abd 56. Above the contacting trays 47 there are arranged similar high-capacity trays 46. The intertray distance between these high-capacity trays, however, is larger than that between the contacting trays 47. Therefore, froth is given time to break so that less liqiuid is entrained with the gas leaving the column 41 via a gas outlet 43. When gas and liquid are passed into the column 41 via inlets 42 and 44, respectively, an additional amount of gas is passed to the downcomer 49 of the lowermost contacting tray 47 via the gas conduit 59, thereby restricting the liquid flow through the downcomer 49 and the seal pan 50. At a desired pressure drop over the contacting trays 47, as indicated by the sensors 55 and 56, the additional gas flow is adjusted via valve 53 and differential pressure controller 54. The pressure drop over the high-capacity trays 46 may be shown on a differential pressure indicator 57, indicating the pressure difference between sensors 56 and 58. Eventually, liquid is withdrawn via an outlet 45.

Figure 4:
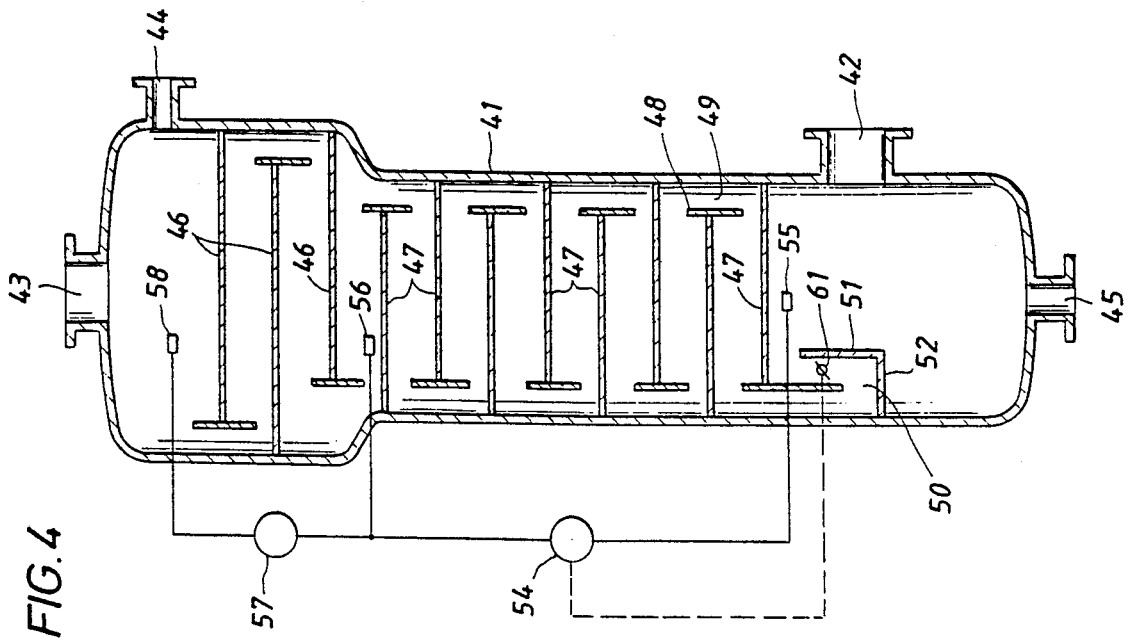
FIG. 4 shows an apparatus in which a valve is provided in the downcomer section and the column of which has an increased diameter at the position where high-capacity trays are provided.

In FIG. 4 a similar embodiment as in FIG. 3 is shown. Corresponding features have therefore been given the same numerals as in FIG. 3. In the embodiment of FIG. 4 the flow of liquid from the lowermost contacting tray 47 is controlled by means of a butterfly valve 61 in the seal pan 50. This valve 61 may be located in any desired place in the downcomer or seal pan. It is in communication with the differential pressure controller 54. Another difference compared with FIG. 3 relates to the high-capacity trays 46. These trays 46 are not placed at larger intertray spacings but they have been given an increased diameter. Due to the thus increased active area the gas velocity is reduced so that entrainment of liqui by the gas leaving the column via gas outlet 43 is substantially prevented.

A further advantage of the use of providing extra trays above the contacting trays that are normally kept in a controlled flooded condition, is that he lean gas at these trays is contacted with fresh liquid supplied via a liquid inlet which benefits the mass transfer between the gas and the liquid. For, in this arrangement the lean gas is polished to contain the lowest concentration of components being removed that is possible with the particular treating liquid being used.

What is claimed is:

1. Apparatus for contacting a gas and a liquid comprising:
   a substantially vertical column containing a plurality of substantially horizontal contacting trays is which contacting tray is provided with passages for gas and liquid and wherein at least one of said contacting trays is a control tray;
   a liquid inlet provided in the upper section of the column;
   a gas outlet located above the uppermost contacting tray;
   a gas inlet provided in the lower section of the column;
   a liquid outlet below the lowermost contacting tray;
   means for controlling the flow of liquid from said control tray; and
   a differential pressure controller responsive to means sensing the density of the mixture of gas and liquid at least one contacting tray above said control tray which controller communicates with said means for controlling the flow of liquid from said control tray and wherein said differential pressure controller is activated by the pressure difference between the space above said uppermost contacting tray and the space below said control tray.

2. The apparatus of claim 1 wherein said liquid inlet is provided above the uppermost contacting tray.

3. The apparatus of claim 1 wherein said gas inlet is provided below the lowermost contacting tray.

4. The apparatus of claim 1 wherein said control tray is the lowermost contacting tray.

5. The apparatus of claim 1 wherein said means for controlling the liquid from the control tray comprises a valve in a liquid conduit emanating from said liquid outlet.

6. The apparatus of claim 1 wherein the passage for liquid flow from said control tray comprises a downcomer.

7. The apparatus of claim 6 wherein said downcomer debouches into a seal pan.

8. The apparatus of claim 7 wherein said means for controlling the flow of liquid from said control tray is a vlave positioned in said seal pan.

9. The apparatus of claim 6 wherein said means for controlling the flow of liquid from said control tray comprises a conduit for a vapor and said conduit debouches into said downcomer.

10. The apparatus of claim 6 wherein said downcomer is sealed and a liquid conduit passes from said downcomer to a space below said control tray, said conduit being provided with a valve whcih serves as said means for controlling the flow of liquid from said control tray.

11. The apparatus of claim 1 further comprising at least one high-capacity tray, said high-capacity tray having a larger capacity than said other contacting trays.

12. The apparatus of claim 11 wherein said high-capacity tray has a larger intertray spacing than the spacing between said other contacting trays.

13. The apparatus of claim 11 wherein said high-capacity tray has a larger active area than said other contacting trays.

* * * * *